(No Model.)
C. E. ROBERTS.
Emery Wheel Dresser.
No. 242,046. Patented May 24, 1881.
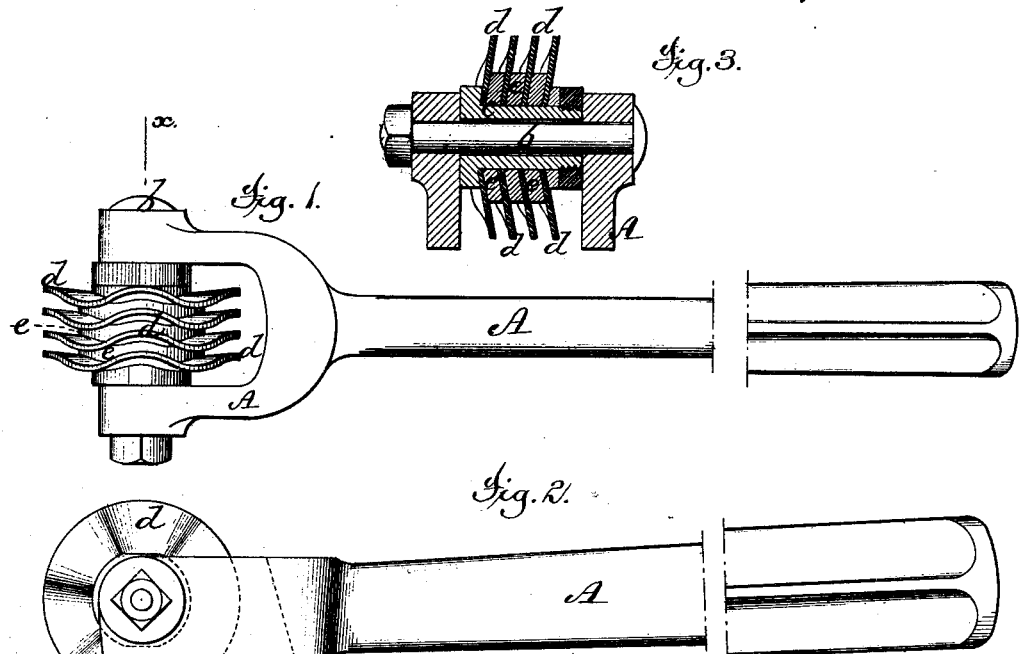
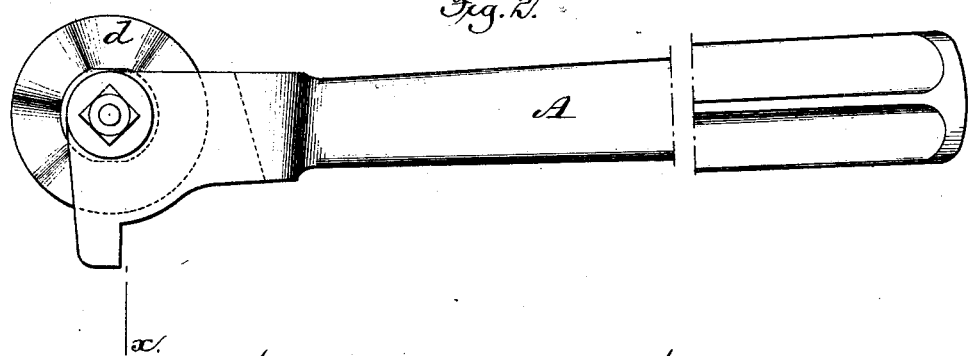
Attest;
Geo. H. Graham
Jacob Felbel
Inventor,
Chas. E. Roberts
By
J. N. McIntire
Att'y.

UNITED STATES PATENT OFFICE.

CHARLES E. ROBERTS, OF CHICAGO, ILLINOIS.

EMERY-WHEEL DRESSER.

SPECIFICATION forming part of Letters Patent No. 242,046, dated May 24, 1881.

Application filed March 11, 1881. (No model.)

*To all whom it may concern:*

Be it known that I, CHAS. E. ROBERTS, of Chicago, in the county of Cook and State of Illinois, have invented an Improved Emery-Wheel Dresser; and I do hereby declare that the following is a full and exact description thereof, reference being had to the accompanying drawings, making part of this specification.

My invention relates to tools employed for turning off or dressing the working faces or surfaces of solid emery-wheels, and has for its object to provide for this purpose a tool which, while it shall have its cutting devices composed of metal, (steel,) and can therefore be made and sold at a comparatively low price, shall be capable of as effectually dressing the emery-wheel as a tool in which the cutting device or devices is or are composed of the much more costly substance now most successfully employed and known as "black diamonds" or "carbon points."

To this end and object my invention consists in an emery-wheel dresser composed of a gang of disk-like cutters mounted fast on an arbor, which latter is mounted to turn freely on its axis in the tool stock or handle of the dresser, the said disk-like cutters being of such contour that the perimeter of the gang shall be coincident with a cylindrical surface generated about the axis of the arbor, and each either having its sides corrugated or wave-like in form, or being set at an angle to the axis of rotation of the gang, all as will be hereinafter more fully explained.

To enable those skilled in the art to make and use my novel tool or contrivance for dressing emery-wheels, I will now proceed to more fully describe its construction and operation, referring by letters to the accompanying drawings, in which—

Figure 1 is a top view; Fig. 2, a side elevation; and Fig. 3 a detail section, showing one form of my improved dresser.

At Figs. 4 and 5 is shown, in side and top views, another form of gang-cutters or a modification of my invention; while at Figs. 6 and 7 is shown, in side and top views, still another modification.

In the several views the same parts will be found designated by the same letter of reference.

A represents the handle or tool-stock of the dresser or cutter device, which handle is adapted (as usual in other dresser-tools) to be rested (at the tool end) on the rest of the lathe or other machine in which may be mounted and rotated the emery-wheel to be acted upon or dressed.

In the bifurcated end of said handle A is mounted, to turn freely on the screw-bolt or mandrel *b*, a hollow arbor, *c*, on which is secured the gang of disk-like cutters *d d*, &c. These cutters *d* are placed at short and equal distances apart on the arbor *c*, as shown, being held apart by washers *e*, of any suitable material, preferably of hard leather.

The contour of the perimeter of each cutter *d* is such (no matter what may be the shape of the surfaces or sides of said cutter) that the perimeter of the cutter will everywhere be the same distance from the axis of arbor *c*, measuring in lines at right angles to said axis. In other words, no matter what the superficial shape or what the arrangement of the cutters on the arbor, their perimeters would all of them touch the walls of a cylindrical bore into which they would fit, and which had its axis coincident with the axis of arbor *c*; but, as shown, these cutters *d* are either so shaped, as seen at Figs. 1, 2, 3, or, if flat, are so placed on the arbor *c*, that the perimeter of no one of them lies throughout in a plane that is at right angles to the axis of motion of the cutters; and to this peculiarity of shape or placement of the cutters, whereby the cutting-edge of each, as the gang revolves, is constantly moving laterally relatively to the point or line of contact between each cutter and the wheel being dressed, is due, in my judgment, the novel mode of operation which renders my improved tool or device capable of producing the effects I have found it practically capable of producing.

When made as shown at Figs. 1, 2, 3, the corrugated form of the cutters induces each cutting-edge to travel in a serpentine course on the surface of the emery-wheel revolved in contact with the gang, (assuming the tool to have its handle held in one place,) while with a gang of flat disk-like cutters, such as seen at *d*, Figs. 4 and 5, the line of travel of the cutting-edge marked out (under like circumstances) on the surface being acted upon would be of substantially the same character, but produced by the arrangement of the disks obliquely to their axis of motion.

In an arrangement of disks such as seen at Figs. 6 and 7 each cutter would mark out a serpentine course of travel, but, unlike the other forms shown in this form of gang-cutters, the several lines of travel of the cutter-edges on the emery-wheel surface would not be parallel.

No exact width of cutter nor distance between the cutters is important. The dimensions shown I have found to work with perfect satisfaction; but they may, of course, be varied, and other arrangements and forms of disk than those shown may be adopted or used without materially changing the principle of construction and mode of operation of the tool, so long as either the shape or the form, or both, of the disk-like cutters be such that in the rotation of the gang in contact with the revolving periphery of the emery-wheel each cutting-edge or disk-perimeter shall act successively at different points widthwise of the gang and wheel-surface where the two come together, (assuming the gang of cutters and the emery-wheel to both revolve only, and not move laterally.)

In the use or practical operation of the dresser the gang is, of course, moved bodily sidewise, as usual in the use of a single (turning-off) diamond-point tool, or in the use of a dressing-tool composed of numerous points set in revolving disks mounted on the arbor of a tool-handle such as I have shown; but the peculiar operation and great efficiency of the improved tool are due, I think, to the fact that every successive point in the continuous perimeter of each disk-like cutter, as it moves in rolling contact with the emery-wheel, must, irrespectively of any bodily movement of the gang, come in contact successively with different parts of the wheel's surface widthwise of its face.

In the use of cutting-points such as heretofore employed in tools for dressing emery-wheels, &c., arranged in the peripheries of disks and rolling against the rotating face of the wheel, each active point of the tool has operated with a picking action—i. e., with a concussive movement—while in the operation of my improved tool a continuously-acting cutter-surface operates with a sort of shearing movement.

The action of each cutter-edge in my improved tool resembles somewhat, as regards the direction of movement, the action of a single cutting-point moved laterally on the revolving wheel's face, but differs, however, from the action of such single cutting-point, in that each cutting device acts with a rolling or grinding motion instead of a cutting one—that is to say, in my improved device each cutter, though it travels at the point of contact with the wheel in a path somewhat resembling that of a lathe-tool moved back and forth widthwise of the wheel's face, acts in a great degree by attrition, and rather grinds than cuts off the destructible surface.

As in the dressing of emery-wheels it is usually important to merely remove all embedded foreign material (which is usually much softer than the emery-wheel stock) and cut away only such small portions of the surface of the wheel as may have become undue protuberances of a true surface, it follows that any tool which will do this without unnecessarily reducing the size of the wheel will effect a proper dressing or truing up of the wheel with the least cost in both labor and loss of stock; and I believe that my improved tool accomplishes these objects with a high degree of perfection, while it is at the same time a comparatively cheap tool to manufacture.

I wish it to be understood that I do not consider my invention as restricted to any precise form, size, or arrangement of cutting or grinding disks, so long as there be a gang of cutters so shaped or arranged, or both, that the action peculiar to the tool shown, and which I have described, will be attained. Neither do I wish to be understood as claiming, broadly, a series of corrugated or obliquely-arranged metal disks mounted fast on an axis and adapted to rotate in contact with the face of a wheel to be dressed or trued up, as such series of metal disks have before been employed to operate on the surface of a grindstone, but in an organism or contrivance in which said series of metal disks and the stone to be acted upon by said disks could not have any movement relatively transversely to the face or periphery of the stone.

My invention relates wholly, as I have hereinbefore explained, to a tool for dressing wheel-faces that has a handle and is adapted to be moved sidewise over the wheel's face, as is usual with such hand-tools as are generally known as "emery-wheel dressers;" and

What I claim as of my invention, and desire to secure by Letters Patent, is—

In combination with the handle A, having a bifurcated end for the accommodation of the grinder or dresser devices proper, and adapted to be supported and moved on a rest arranged near the face of the wheel to be dressed, a series of metal disks either corrugated or arranged obliquely relatively to their axes of motion, the whole constructed and operating in the manner and for the purpose set forth.

In testimony whereof I have hereunto set my hand and seal this 17th day of February, 1881.

CHAS. E. ROBERTS. [L. S.]

In presence of—
M. R. SCULLIN,
JAMES M. DODGE.